United States Patent
Pridmore

(10) Patent No.: US 9,396,503 B2
(45) Date of Patent: Jul. 19, 2016

(54) SOCIAL QUEUE

(71) Applicant: FACEBOOK, INC., Menlo Park, CA (US)

(72) Inventor: Keenan Pridmore, Chicago, IL (US)

(73) Assignee: FACEBOOK, INC., Menlo Park, CA (US)

( * ) Notice: Subject to any disclaimer, the term of this patent is extended or adjusted under 35 U.S.C. 154(b) by 299 days.

(21) Appl. No.: 13/956,236

(22) Filed: Jul. 31, 2013

(65) Prior Publication Data

US 2015/0039689 A1 Feb. 5, 2015

(51) Int. Cl.
*H04L 29/08* (2006.01)
*G06Q 50/00* (2012.01)
*G06Q 10/02* (2012.01)

(52) U.S. Cl.
CPC ............... *G06Q 50/01* (2013.01); *G06Q 10/02* (2013.01)

(58) Field of Classification Search
CPC ..... G06Q 50/01; G06Q 10/02; G06Q 3/0045; H04L 67/306; H04L 3/523
See application file for complete search history.

(56) References Cited

U.S. PATENT DOCUMENTS

2007/0165608 A1* 7/2007 Altberg et al. ................ 370/352

* cited by examiner

*Primary Examiner* — Kim T Nguyen
(74) *Attorney, Agent, or Firm* — Nicholson De Vos Webster & Elliott LLP

(57) ABSTRACT

Exemplary methods, apparatuses, and systems receive a request from a user device to add a user identifier to a queue and, in response, transmit a current position for the user identifier in the queue. The first user identifier is promoted to an improved position in the queue in response to receiving an indication of performance of an action associated with the first user identifier.

20 Claims, 6 Drawing Sheets

SOCIAL QUEUE

FIELD

The various embodiments described herein relate to creating and maintain a digital queue of users of a social network. In particular, the embodiments relate to a social queue in which users can improve their position in the queue by performing actions within or otherwise related to the social network.

BACKGROUND

Exclusive events, such as events with limited tickets, contests, and product releases, generate large physical lines of people. Waiting in line may be unpleasant, but people are willing to do so for an opportunity to obtain the corresponding exclusive item, e.g., tickets, a prize, a product with a limited supply, etc. These large lines draw attention to and generate excitement around the exclusive event.

SUMMARY OF THE DESCRIPTION

Exemplary methods, apparatuses, and systems receive a request from a first user device to add a first user identifier to a queue and, in response, transmit a current position for the first user identifier in the queue. The first user identifier is promoted to an improved position in the queue in response to receiving an indication of performance of an action associated with the first user identifier. For example, the action may be performed within a social network.

In one embodiment, exemplary methods, apparatuses, and systems also transmit a recommended action to be performed and a number of positions in line the user will advance in response to performance of the recommended action. For example, the recommended action may be based upon a geographic location associated with the user or information associated with the first user identifier within the social network.

Other features and advantages will be apparent from the accompanying drawings and from the detailed description.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

Embodiments described herein generate and maintain a social queue for an exclusive event or promotion. A social queue server presents each participating user with a current position in line. Users in the queue perform one or more actions associated with a social network to improve their position within the queue. The social queue server publishes, to the social network, narratives in response to the actions to draw attention to and generate excitement around the exclusive event/promotion. Additionally, the actions increase the engagement of the participating users with a product, brand, performer, promoter, or entity that initiated the social queue.

Figure 1:
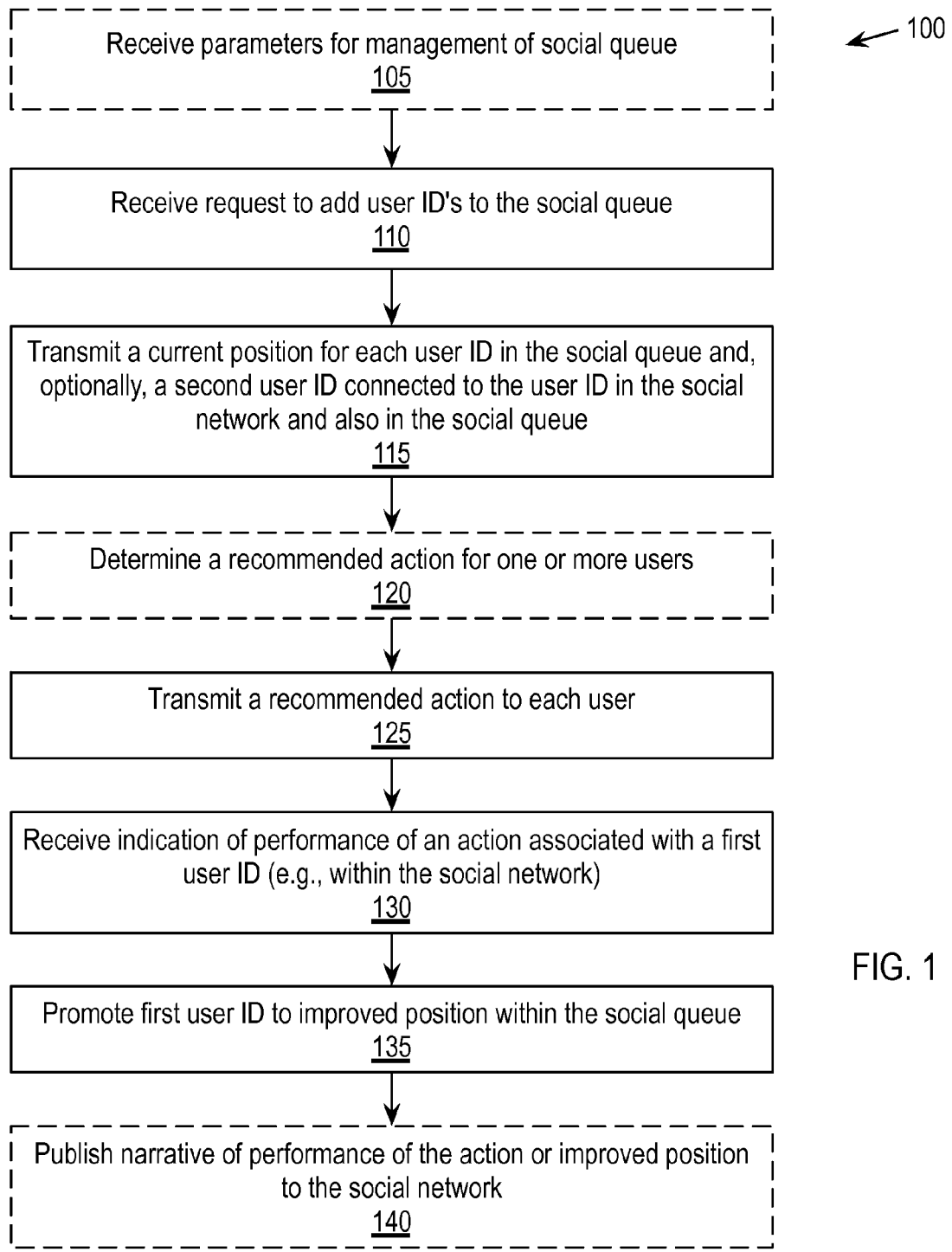
FIG. 1 is a flow chart illustrating an exemplary method of implementing a social queue.

FIG. 1 is a flow chart illustrating exemplary method 100 of generating and maintaining a social queue. At block 105, a computer receives parameters for management of a social queue. For example, an entity initiating a social queue may enter one or more of a start date, an end date, one or more rewards for ending positions in the queue, actions users may perform to improve their positions in the queue, numbers of positions users will advance within the queue for respective actions, and formats for narratives published to the social network in response to respective actions. Alternatively, one or more of the parameters may be set to default values.

At block 110, the computer receives a request to add a first user identifier (ID) to the social queue. The computer adds the first user ID to the end of the queue. As used herein, a user ID refers to a representation of a user within a social network and a social queue. Additionally, "queue" and "line" are used interchangeably and both represent a data structure created and maintained to organize an ordered list of user ID's and corresponding position numbers.

For example, a first user downloads a social queue application or utilizes a browser-based social queue application, e.g., via a website or within another application. In one embodiment, the social queue is implemented by an external application that operates in a cooperative manner with the social networking system. In an alternative embodiment, the social queue is an internal application that operates within or as a part of the social networking system.

The first user authenticates an association between the social queue and the first user's social networking account. For example, the user may provide a social queue server the first user ID and corresponding password used with the social network. In one embodiment, a landing or welcome page for a social queue application, or a website that implements the social queue, includes log in functionality. Additionally, the user may establish privacy/access permissions to enable the social queue to access social networking data associated with the first user ID or publish narratives to the social network on behalf of or in association with the first user. While block 110 is described with reference to a single user, multiple users join the social queue in a similar manner.

At block 115, the computer transmits (for display on a user device) a current position of the first user ID within the queue. For example the current position is included within a graphical user interface and indicates the position of the first user ID relative to other user ID's.

Figure 2:
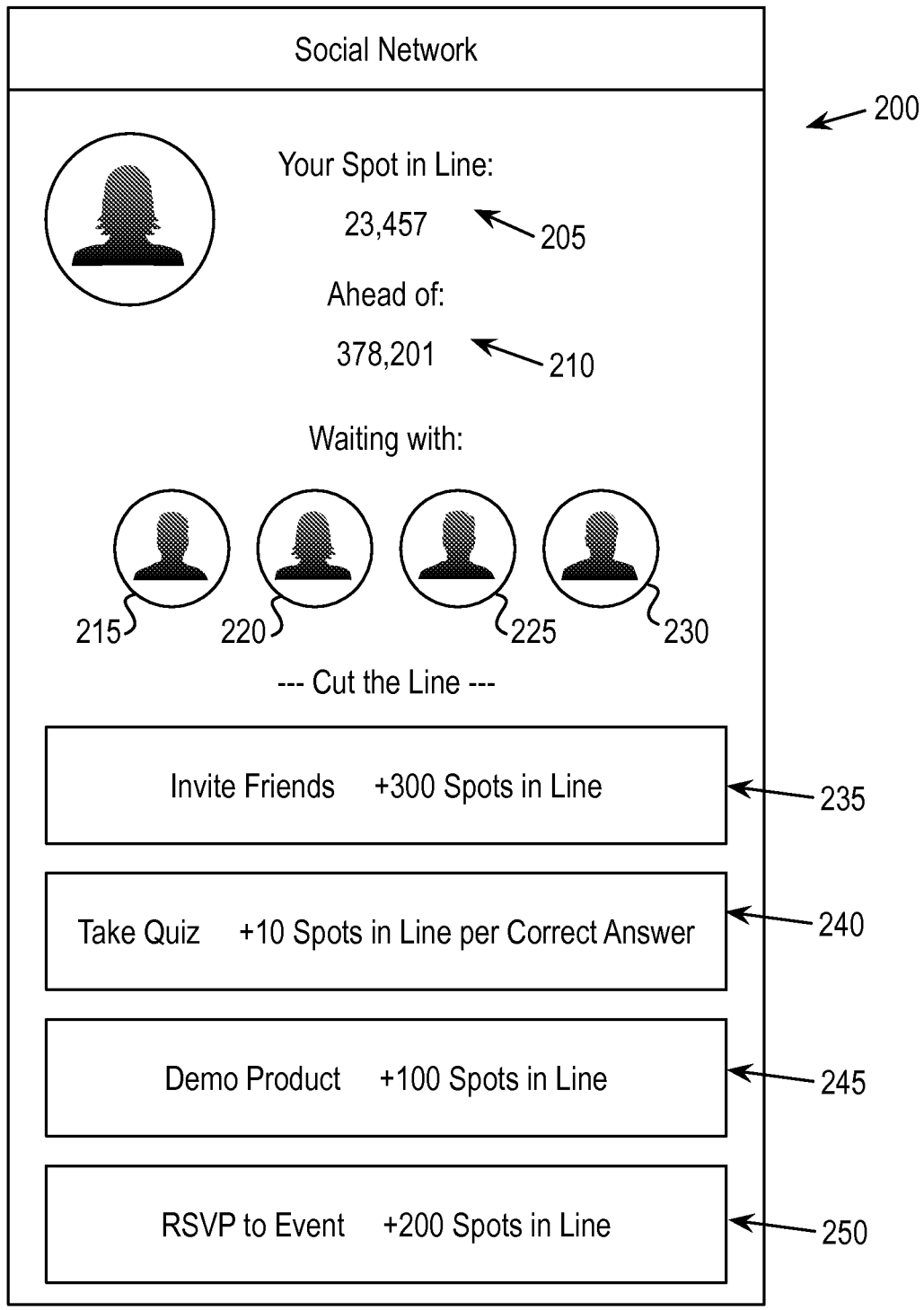
FIG. 2 illustrates an exemplary graphical user interface displaying a current position of a user identifier in a social queue.

FIG. 2 illustrates exemplary graphical user interface (GUI) 200 displaying current position 205 of a user identifier in a social queue. In one embodiment, the computer further transmits a number of users behind the user 210. For example, the user ID in GUI 200 is in position 23,457 and is ahead of 378,201 other users.

In one embodiment, the computer optionally transmits one or more user ID's connected to the user in the social network that are also in the social queue. For example, the computer cross-references or otherwise searches social network data including connections associated with the user ID in the social network (described with reference to FIG. 3) and user ID's in the social queue. GUI 200 displays connected user ID's 215-230 as images representing the corresponding users. In an alternate embodiment, user ID's, or corresponding names, are displayed. Again, while block 115 is described with reference to a single user, queue position information is transmitted to multiple users in a similar manner.

Returning to FIG. 1, at block 120, the computer optionally determines one or more recommended actions for users to perform to be promoted within the social queue. For example, the computer searches social network data associated with the user ID to determine demographic information about the user, demographic information about the user's connections, the user's interests, the user's activities, etc. The computer determines one or more recommended actions tailored to each user based upon the obtained social network data. For example, if the entity that initiated the queue sells multiple products aimed at different demographic groups, the computer selects a product that corresponds to the user's demographic and recommends that the user view a demonstration of or advertisement for that product in order to advance a number of positions in the queue.

In another embodiment, the computer obtains geographic data associated with the user. Geographic data may be obtained from a user device (e.g., a mobile device capable of providing positioning data) or from the social network data (e.g., a location of the user's hometown, workplace, "check-in" data, etc.). For example, the computer selects a store or event near the geographic location associated with the user and recommends that the user use the social network to check-in at the store or attend the event and publish attendance of the event to the social network.

Alternatively, the computer utilizes default recommended actions that are independent of social network data for an individual user.

At block 125, the computer transmits a set of one or more determined or default recommended actions to each user. For example, a user may perform one or more of the following actions within the social network: liking a page for an entity/product, following an entity/page for a entity/product, submitting an RSVP for an event, purchasing a product, taking a quiz, playing a game, listening to media (e.g., a song or advertisement), watching a video, trying a demo of a product, creating content (e.g., a narrative and/or picture) related to an entity, inviting a friend to join the social queue or to perform another action, etc. Additionally, the user may perform an action outside of the social network. For example, a recommended action may include the user visiting an external website and/or submitting a review of a product. In one embodiment, the computer further transmits a number of positions in the queue that a user ID will be promoted in response to a user performing the action.

In FIG. 2, GUI 200 includes exemplary recommended actions 235-250. Each recommended action 235-250 provides a short description of the action and a number of positions in the queue a user ID will be promoted in response to a user performing the action. In one embodiment, in response to selection of recommended actions 235-250 within GUI 200, the computer facilitates the completion of the corresponding action. For example, in response to selection of recommended action 235, the computer accesses the user's list of connections/friends within the social network and enables the user to select one or more of them to receive an invite. The computer transmits the invitation(s) through the social network. If the action were "liking" an entity, selection of a corresponding GUI element would result in the computer transmitting the action to the social network.

In an embodiment in which the computer determines recommended actions based upon social network data associated with a user ID, one or more of recommended actions 235-250 are tailored to the user. For example, recommended actions 245 and 250 may be further refined with user data. Recommended action 245 may include a specific product targeted at the user's demographic or include a store location based upon the user's location data. Similarly, recommended action 250 may select an event targeted at the user's interests as determined from social networking data and/or located near the user as determined from the user's location data.

Figure 3:
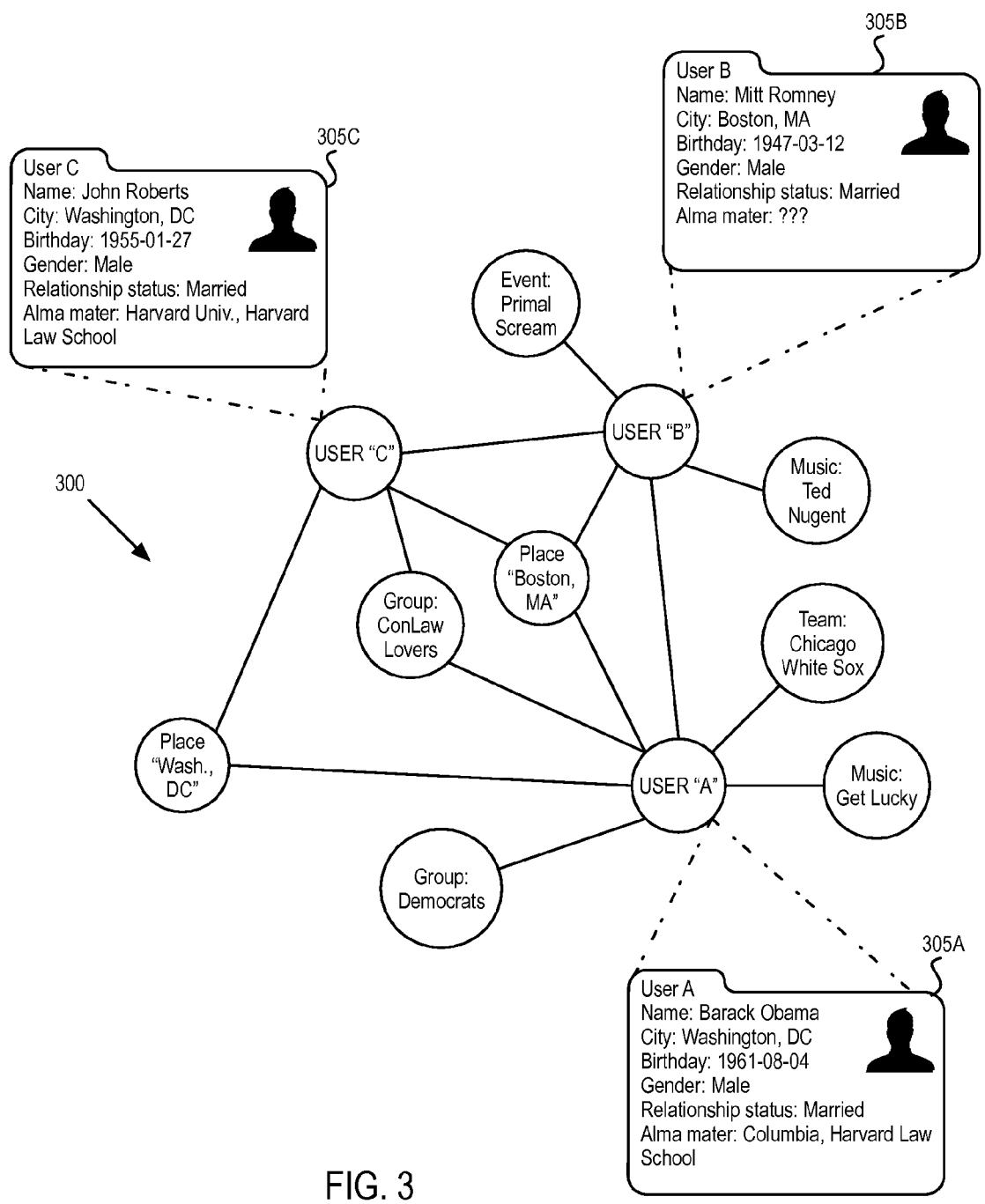
FIG. 3 illustrates an exemplary graph of social network data used to determine a recommended action.

FIG. 3 illustrates exemplary graph 300 of social network data. In graph 300, objects are illustrated as circles and actions are illustrated as connections between circles. Developers of the social network or corresponding social network applications define actions to represent different ways that users may interact with the social network and/or their applications. As users perform actions, connections are made between users and objects. For example, User A has performed a number of actions within the social network, indicating that he previously lived in Boston, currently lives in Washington D.C., joined groups for Democrats and ConLaw Lovers, is following the White Sox, used an application to listen to the song, "Get Lucky," and is friends with User B. User B and User C have also performed a number of actions with respect to objects within graph 300.

In one embodiment, users are able to add demographic information to user profiles 305A-C. In one embodiment, for demographic information that has not been entered by a user, a social network application generates an estimate based upon the user's actions, connections, and/or actions of connections. For example, User B has not entered an alma mater into user profile 305B. A social network application may determine from User B's contacts, activities, cities of residence, etc. that User B's likely alma mater is one or both of Brigham Young University and Harvard University.

In one embodiment, demographic data further includes a weight or score indicating an affinity between a user and an object. For example, repeated user action with one object may indicate a stronger affinity for said object than another object with which the user has limited interaction. First degree connections, e.g., the friendship between User A and User B, may indicate a stronger affinity than second degree connections, e.g., User A is friends with User B, who is friends with User C, creating a second degree connection between User A and User C. An indication that two users are married may indicate a stronger affinity than if two users are friends. Additionally, temporal and geographic proximity of actions/users are other exemplary indicators of affinity.

The illustrated objects, connections, profiles, and affinity values are exemplary social network data used for determining recommended actions. In one embodiment, users may select privacy settings to control what social network data is shared, with whom the data is shared, and/or what data used for determining recommended actions.

Returning to FIG. 1, at block 130, the computer receives an indication of the performance of an action associated with a user ID. For example, a user logged in with the social queue application and/or social network performs a recommended action. The social network transmits or the social queue server otherwise reads/determines that the action has been performed. In an embodiment in which the social queue facilitates the completion of the corresponding action, the computer transmits a command to the social network on behalf of the user to perform an action (e.g., liking an entity) and receives a confirmation of the command as an indication of the performance of the action. Alternatively, input received from a user device to perform an action (e.g., initiated via GUI 200) is the indication of the performance of the action.

At block 135, the computer promotes the first user ID to an improved position within the social queue in response to the indication of the performance of the action. For each action performed, the computer moves the corresponding user ID to the improved position within the social queue data structure. In one embodiment, the promotion includes transmitting an updated position to a user device (e.g., in a manner similar to block 115). For example, referring to FIG. 2, if a user were to complete recommended action 245, the computer would promote the first user ID 100 positions within the queue. The promotion of position in the queue is performed relative to other user ID's that may or may not also be performing corresponding actions to improve their own positions within the queue.

At block 140, the computer publishes a narrative to the social network. Given that some recommended actions may, in and of themselves, involve publishing a narrative to the social network, that the social queue may not publish all actions (e.g., to avoid over-publishing to the social network), or that a user privacy setting prevents social queue publications, performance of the publication at block 140 is optional. In one embodiment, publications to the social network include one or more of a narrative of the action, a number of positions a user was promoted for performing an action, a number of positions a user is away from the head of the queue or winning a prize, a link to enable users viewing the publication to join the queue, an image, etc.

Figure 4:
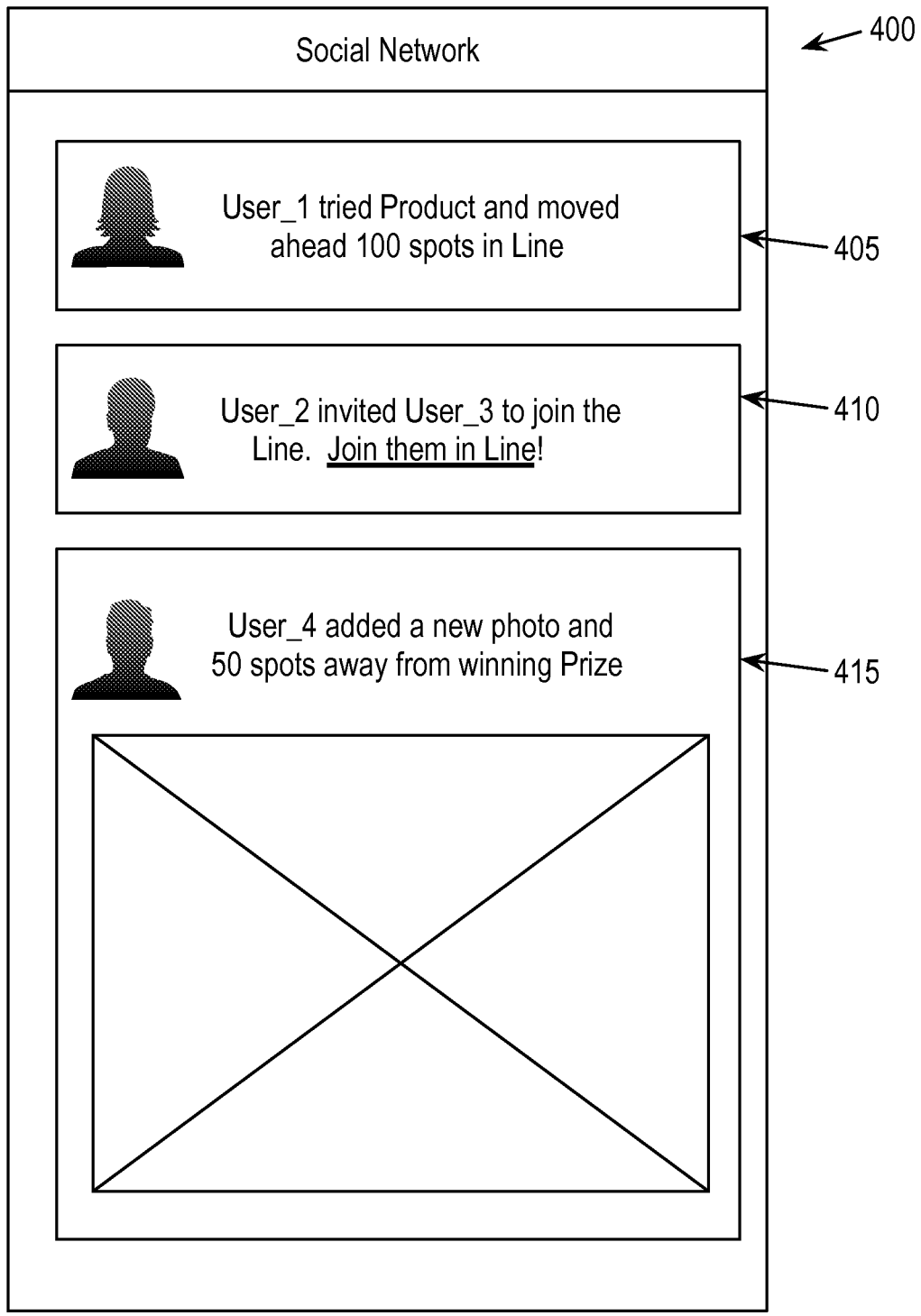
FIG. 4 illustrates an exemplary graphical user interface displaying a social network newsfeed of social queue publications.

FIG. 4 illustrates exemplary GUI 400 displaying a social network newsfeed of social queue publications 405-415. Publication 405 provides a narrative of the action, User_1 trying a product, and the corresponding number of positions User_1 was promoted in the queue. Publication 410 provides a narrative of User_2 inviting User_3 to join the queue and link (illustrated by way of underlined text) for other users to join the queue. Publication 415 includes a narrative of User_4 adding a photo related to the queue and, as a result, that User_4 is 50 positions away from winning a prize.

Figure 5:
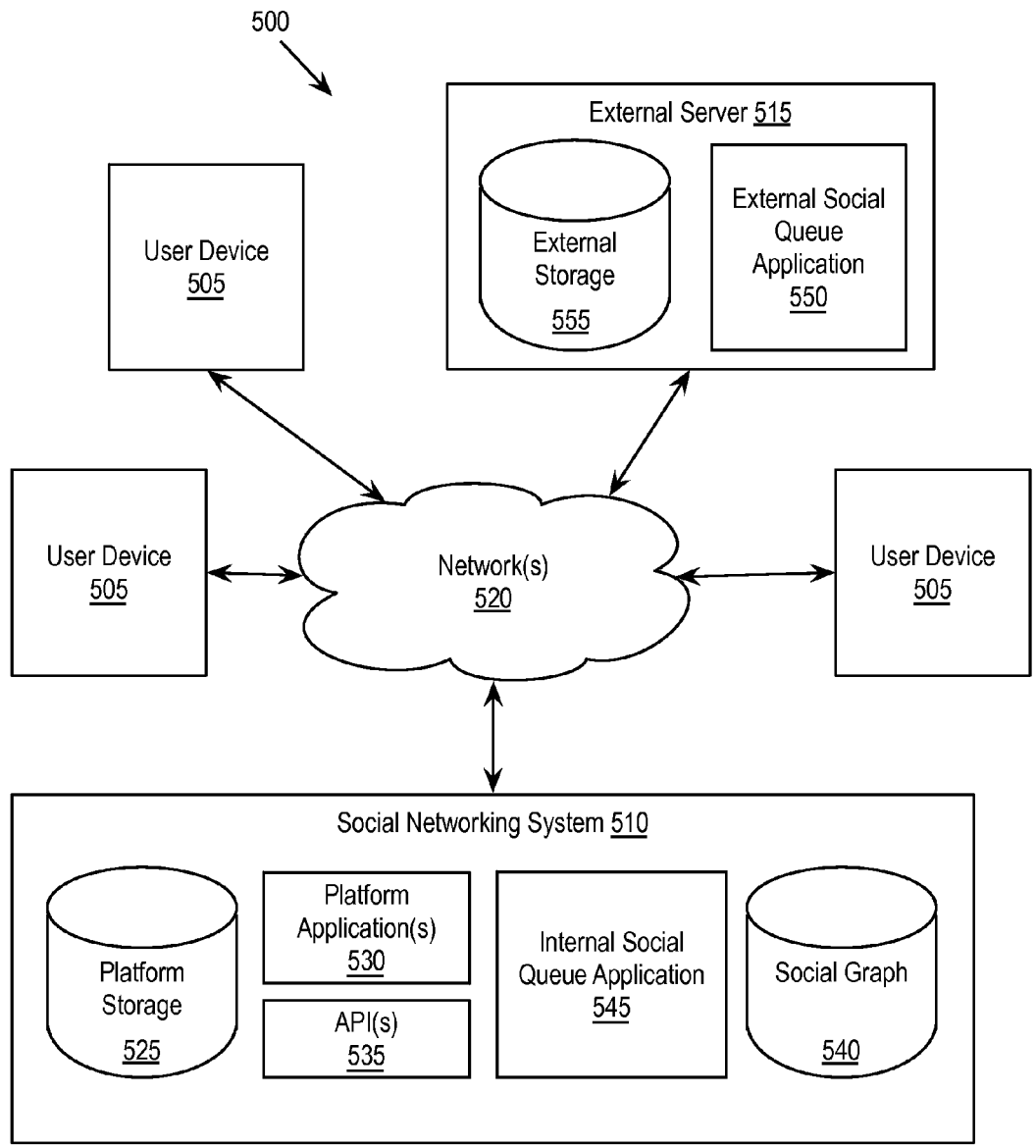
FIG. 5 illustrates, in block diagram form, an exemplary social network.

FIG. 5 illustrates, in block diagram form, exemplary social network 500. Social network 500 includes user devices 505, social networking system 510, and external server 515 coupled to one or more networks 520. A user interacts with social networking system 510 using a user device 505, such as a personal computer or a mobile phone. For example, user device 505 communicates with social networking system 510 via an application such as a web browser or native application. Typical interactions between user device 505 and social networking system 510 include receiving news feed publications, operations to view profiles of other users of social networking system 510, contributing and interacting with media items, joining groups, listing and confirming attendance at events, checking in at locations, liking certain pages/posts, creating pages, etc. User device 505 further enables a user to join a social queue, receive data from a social queue server, display social queue GUI's 200 and 400, and initiate social queue actions, as described herein.

Social networking system 510 includes platform storage 525, one or more platform applications 530, one or more application programming interfaces (API's) 535, social graph 540 (e.g., as described with reference to FIG. 3), and internal social queue application 545. Platform storage 525 stores user preferences/settings, profile data, etc. Exemplary platform applications 530 include the platform for social interactions (e.g., publishing posts, pictures, etc.) as well as social games, messaging services, playing music, and any other application that uses the social platform provided by social networking system 510.

In one embodiment, social networking system 510 acts as a social queue server and method 100 is performed, in whole or part, by internal social queue application 545. Social network data (e.g., described with reference to FIG. 3) is maintained within and received from platform storage 525 and/or social graph 540. In one embodiment, external server 515 acts as a social queue server and method 100 is performed, in whole or part, by external social queue application 550. Social queue data is received from and/or stored in one or more of the external storage 555, platform storage 525, and social graph 540. One or more API's 535 enable external applications to work with social networking system 510. For example, external social queue application 550 utilizes an API 535 to authenticate a user based upon the user's social networking log in username and password. Additionally, external application 550 utilizes one or more API's 535 to run the application within platform application 530, to publish a post to platform application 530, to access the user's social network connections in social graph 540, etc.

Figure 6:
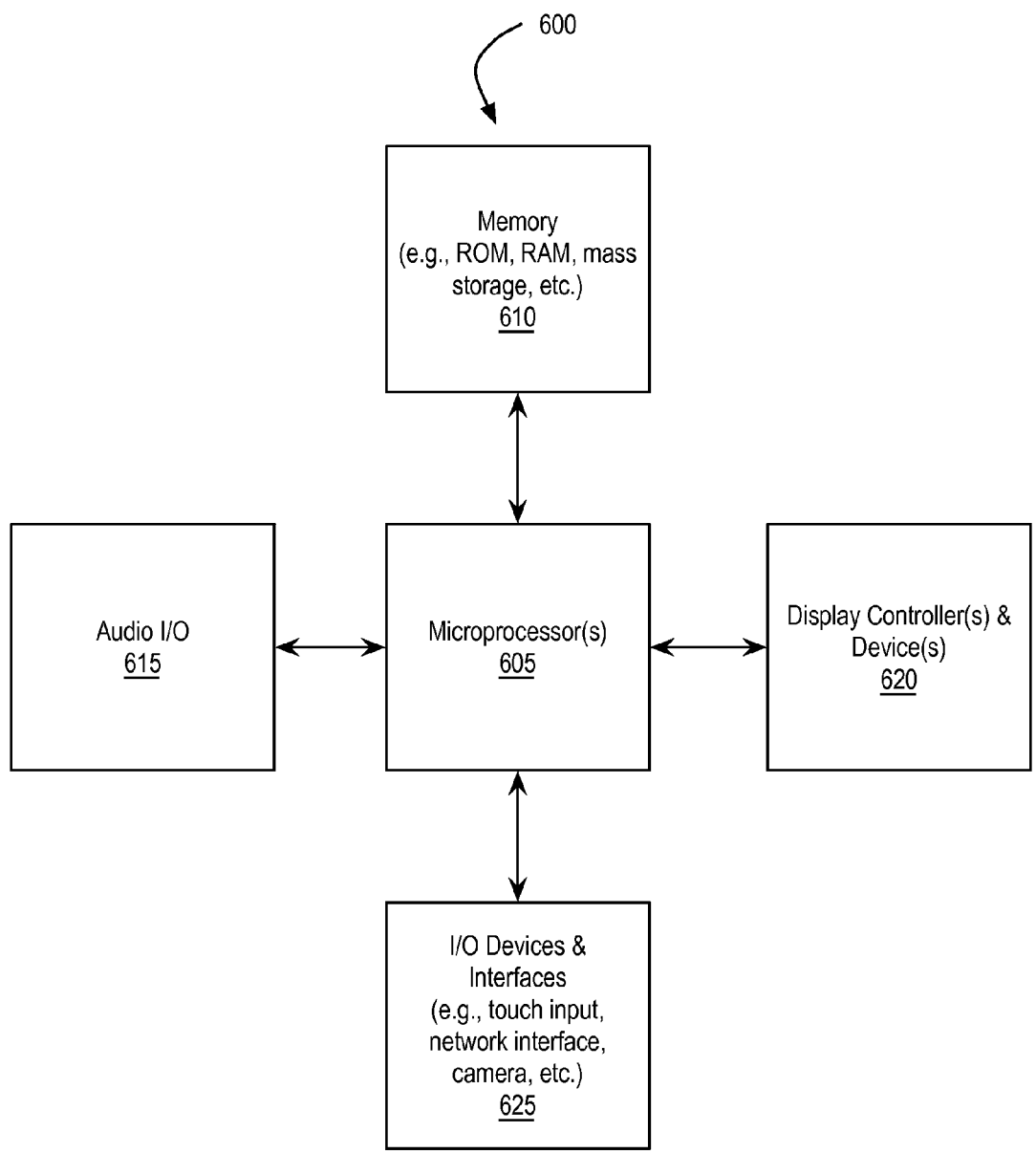
FIG. 6 illustrates, in block diagram form, an exemplary processing system to implement a social queue.

FIG. 6 illustrates a block diagram for exemplary data processing system 600 to implement an embodiment of a social queue. Data processing system 600 includes one or more microprocessors 605 with one or more processor cores. Several connected system components (e.g., multiple connected chips) may be connected to processors 605. Alternatively, data processing system 600 may be a system on a chip (SOC), where most or all system components reside on a single chip. Data processing system 600 includes memory 610, which is coupled to processors 605. Memory 610 is used for storing data, metadata, and programs for execution by the microprocessors 605. Memory 610 includes one or more forms of volatile or non-volatile memories, such as Random Access Memory ("RAM"), Read Only Memory ("ROM"), a solid-state disk ("SSD"), Flash Memory, Phase Change Memory ("PCM"), or other types of data storage appropriate for use in the data processing system 600. In one implementation of the data processing system 600, memory 610 is stored internally to the system. Additionally, one or more forms of distributed memory may be used to supplement or replace the internally stored memory.

The data processing system 600 includes an audio input/output subsystem 615, which has at least one microphone, to audio input from a user, such as voice instructions. The audio input/output subsystem 615 optionally includes one or more a speakers, to play music or some other audio, or to play audio notifications.

Display controller and attached display device 620 provide a graphical user interface for the user, to interact with data processing system 600. For example, the graphical user interface provides access to social networking system 500 via a web browser, or via an interface provided by an application executing on data processing system 600. In one embodiment, display controller and attached display device 620 present GUI's 200 and 400 to a user.

Data processing system 600 also includes one or more input or output ("I/O") devices and interfaces 625, which are provided to allow a user to transfer data to and from system 600, including input commands. Attached I/O devices 625 include one or more input devices, such as a mouse, keypad or a keyboard, touch or multi-touch input panel, camera, or an optical scanner. Attached I/O devices 625 can also feature one or more bi-directional input/output devices such as a network interface, modem, other known I/O devices, or a combination of such I/O devices.

I/O devices and interfaces 625 may also include a connector for a dock or a connector for a USB interface, Ethernet, FireWire, Thunderbolt, Lightning, etc. to connect system 600 with another device, external component, or a network. Exemplary I/O devices and interfaces 625 also include wireless transceivers, such as an IEEE 802.11 transceiver, an infrared transceiver, a Bluetooth transceiver, a wireless cellular telephony and data transceiver (e.g., GSM, CDMA, WiMAX, LTE, LTE Advanced), or some other wireless protocol to connect data processing system 600 with another device, external component, or a network. In one embodiment, I/O devices and interfaces 625 further include positioning receiver to receive a location signal, e.g., a global positioning system (GPS) signal.

One or more system buses or internal SOC buses may be used to interconnect the various components of data processing system 600.

Data processing system 600 is an exemplary representation of one or more of the user's device 505, at least a portion of the social networking system 510, or the external server 515. For example, data processing system 600 may be a personal computer, a tablet computer, a smartphone, a network enabled media player, an entertainment system, a personal data assistance (PDA) or devices which combine aspects or functions of these devices, such as a media player combined with a PDA and a cellular telephone. Additionally, implementations of data processing system 600 can function as a network computer, a data server, or an embedded processing device within another device or consumer electronic product. As used herein, the terms computer, system, device, processing device, server, and "apparatus comprising a processing device" may be used interchangeably with data processing system 600 and include the above-listed exemplary embodiments. It will be appreciated that additional components, not shown, may also be part of system 600, and, in certain embodiments, fewer components than that shown in FIG. 6 may also be used in data processing system 600.

Aspects of the various embodiments described may be embodied, at least partially, in software. That is, the computer-implemented methods may be carried out in a computer system or other data processing system in response to its processor or processing system executing sequences of instructions contained in a memory, such as memory 610 or other non-transitory machine-readable storage medium. The software may further be transmitted or received over a network (not shown) via network interface device 625. In various embodiments, hardwired circuitry may be used in combination with the software instructions to implement the present embodiments. Thus, the techniques are not limited to any specific combination of hardware circuitry and software, or to any particular source for the instructions executed by data processing system 600.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing a Field-Programmable Gate Array (FPGA), Application-Specific Integrated Circuit (ASIC), a processor, a computer, or a computer system, including a networked computer system. Modules and components of hardware or software implementations can be divided or combined without significantly altering embodiments of the invention.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method comprising:
   receiving, by a queue server, a request from a user device to add a first user identifier to a queue of a first set of users of a communication system, the first user identifier associated with a user of the communication system;
   transmitting, by the queue server to the user device, a current position for the first user identifier in the queue;
   receiving, by the queue server, an indication of performance of an action associated with the first user identifier, wherein performance of the action includes publishing a narrative of the action to a second set of users of the communication system, the second set of users not previously in the queue and separate from the first set of users; and
   promoting, by the queue server, the first user identifier to an improved position in the queue in response to receiving the indication of the performance of the action.

2. The computer-implemented method of claim 1, further comprising:
   transmitting, by the queue server to the user device, a recommended action to be performed and a number of positions in the queue the first user identifier will advance in response to performance of the recommended action.

3. The computer-implemented method of claim 2, wherein the queue server determines the recommended action based upon a geographic location associated with the user.

4. The computer-implemented method of claim 2, wherein the queue server determines the recommended action based upon information associated with the first user identifier within the communication system.

5. The computer-implemented method of claim 1, further comprising:
determining, by the queue server, a second user identifier in the queue that is connected to the first user identifier within the communication system; and
transmitting, by the queue server to the user device, an indication that the second user identifier is in the queue.

6. The computer-implemented method of claim 1, further comprising:
receiving, by the queue server, parameters for queue management, wherein the parameters include one or more of: actions to promote queue position, a number of positions of improvement associated with each action, and a format for communication system publications of actions performed.

7. The computer-implemented method of claim 1, further comprising:
publishing, by the queue server to the communication system, a narrative of the improved position in the queue in response to receiving the indication of the performance of the action.

8. A non-transitory computer-readable medium storing instructions which, when executed by one or more processors in a processing device, cause the processing device to perform a method comprising:
receiving, by a queue server, a request from a user device to add a first user identifier to a queue of a first set of users of a communication system, the first user identifier associated with a user of the communication system;
transmitting, by the queue server to the user device, a current position for the first user identifier in the queue;
receiving, by the queue server, an indication of performance of an action associated with the first user identifier, wherein performance of the action includes publishing a narrative of the action to a second set of users of the communication system, the second set of users not previously in the queue and separate from the first set of users; and
promoting, by the queue server, the first user identifier to an improved position in the queue in response to receiving the indication of the performance of the action.

9. The non-transitory computer-readable medium of claim 8, the method further comprising:
transmitting, by the queue server to the user device, a recommended action to be performed and a number of positions in the queue the first user identifier will advance in response to performance of the recommended action.

10. The non-transitory computer-readable medium of claim 9, wherein the queue server determines the recommended action based upon a geographic location associated with the user.

11. The non-transitory computer-readable medium of claim 9, wherein the queue server determines the recommended action based upon information associated with the first user identifier within the communication system.

12. The non-transitory computer-readable medium of claim 8, the method further comprising:
determining, by the queue server, a second user identifier in the queue that is connected to the first user identifier within the communication system; and
transmitting, by the queue server to the user device, an indication that the second user identifier is in the queue.

13. The non-transitory computer-readable medium of claim 8, the method further comprising:
receiving, by the queue server, parameters for queue management, wherein the parameters include one or more of: actions to promote queue position, a number of positions of improvement associated with each action, and a format for communication system publications of actions performed.

14. The non-transitory computer-readable medium of claim 8, the method further comprising:
publishing, by the queue server to the communication system, a narrative of the improved position in the queue in response to receiving the indication of the performance of the action.

15. An apparatus comprising:
a processing device; and
a memory coupled to the processing device, the memory storing instructions which, when executed by the processing device, causes the apparatus to perform a method comprising:
receiving, by a queue server, a request from a user device to add a first user identifier to a queue of a first set of users of a communication system, the first user identifier associated with a user of the communication system;
transmitting, by the queue server to the user device, a current position for the first user identifier in the queue;
receiving, by the queue server, an indication of performance of an action associated with the first user identifier, wherein performance of the action includes publishing a narrative of the action to a second set of users of the communication system, the second set of users not previously in the queue and separate from the first set of users; and
promoting, by the queue server, the first user identifier to an improved position in the queue in response to receiving the indication of the performance of the action.

16. The apparatus of claim 15, the method further comprising:
transmitting, by the queue server to the user device, a recommended action to be performed and a number of positions in the queue the first user identifier will advance in response to performance of the recommended action.

17. The apparatus of claim 16, wherein the queue server determines the recommended action based upon a geographic location associated with the user or information associated with the first user identifier within the communication system.

18. The apparatus of claim 15, the method further comprising:
determining, by the queue server, a second user identifier in the queue that is connected to the first user identifier within the communication system; and
transmitting, by the queue server to the user device, an indication that the second user identifier is in the queue.

19. The apparatus of claim 15, the method further comprising:
receiving, by the queue server, parameters for queue management, wherein the parameters include one or more of: actions to promote queue position, a number of positions of improvement associated with each action, and a format for communication system publications of actions performed.

20. The apparatus of claim 15, the method further comprising:
    publishing, by the queue server to the communication system, a narrative of the improved position in the queue in response to receiving the indication of the performance of the action.

\* \* \* \* \*